UNITED STATES PATENT OFFICE.

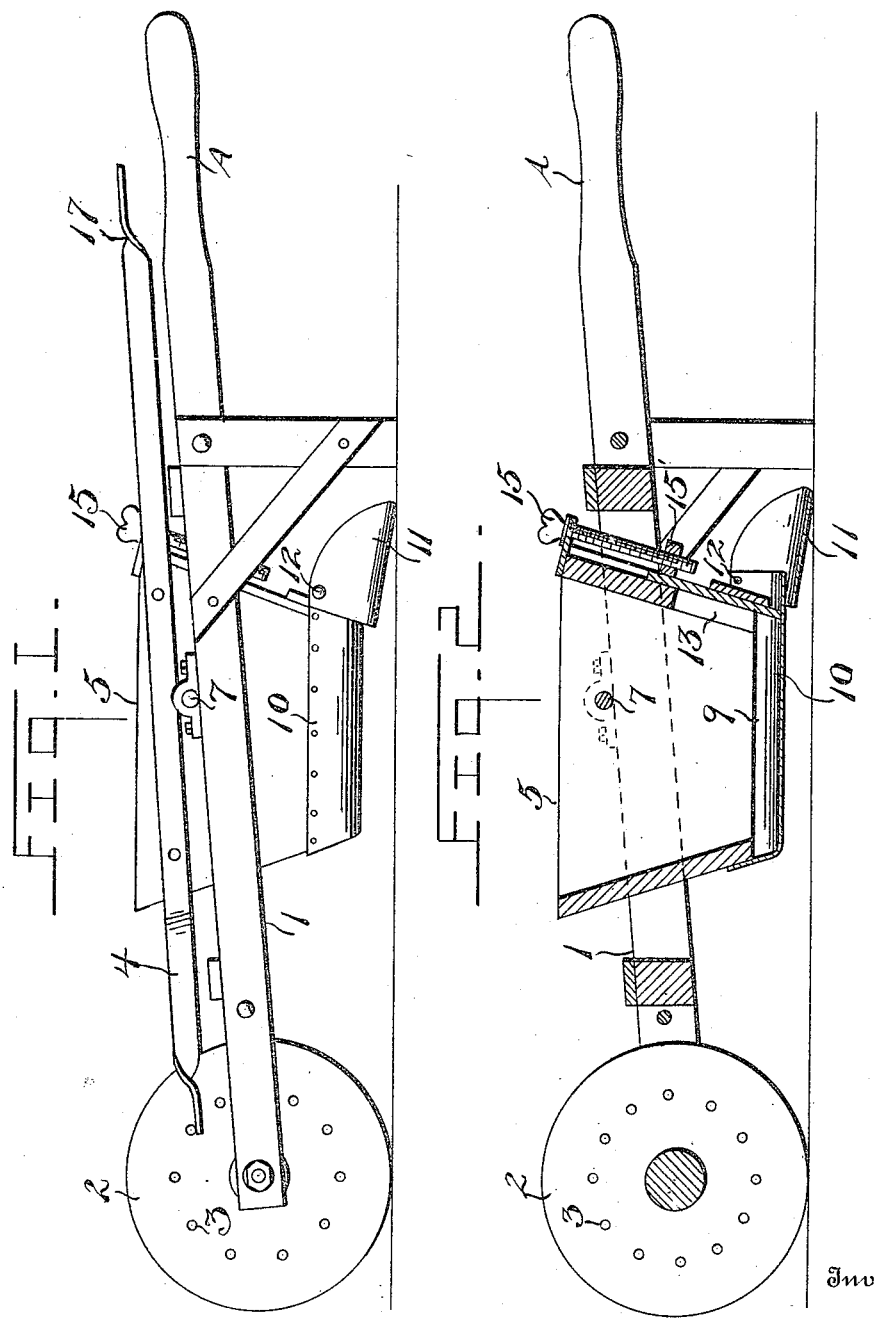

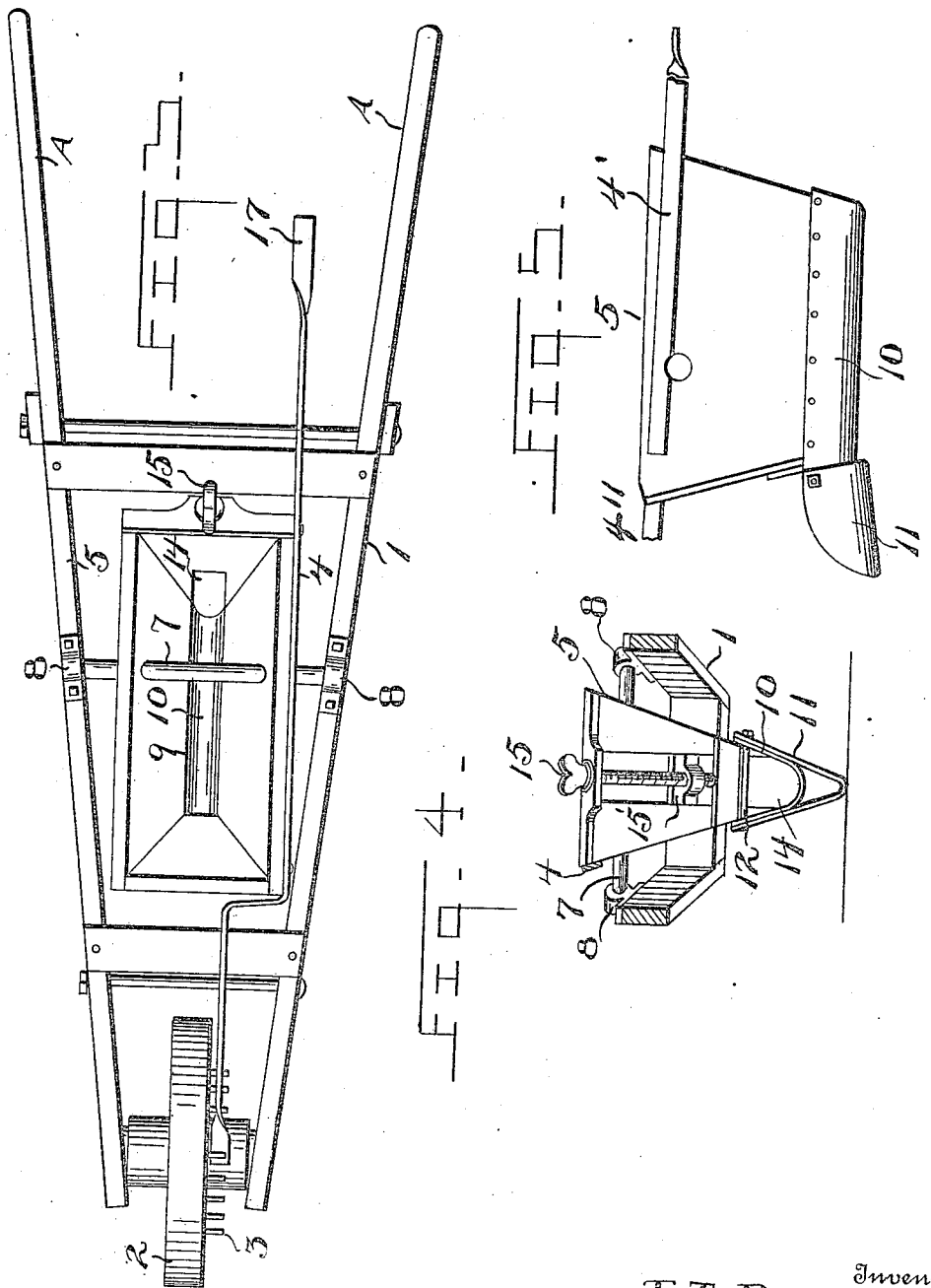

JAMES JOSEPH BRADY, OF CHESTER, GEORGIA.

SEED AND FERTILIZER DISTRIBUTER.

960,261.          Specification of Letters Patent.     Patented June 7, 1910.

Application filed November 24, 1909. Serial No. 529,702.

*To all whom it may concern:*

Be it known that I, JAMES J. BRADY, a citizen of the United States, residing at Chester, in the county of Dodge and State of Georgia, have invented certain new and useful Improvements in Seed and Fertilizer Distributers, of which the following is a specification.

This invention has relation to seed and fertilizer distributers of that class known as walking planters.

The object of the invention is to provide a fertilizer distributer having a vibrating hopper which will distribute a uniform amount of material to be contained therein and in any quantity desired.

Another object of the invention is to provide a seed and fertilizer distributer having a vibrating hopper which may be conveniently and easily tilted out of engagement with the operating mechanism.

Another object of the invention is to provide a seed and fertilizer distributer having a hopper of the vibrating type which may be readily and easily removed from the frame of the distributer for the purpose of repairing, cleaning or storing.

With the above and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings forming a part of this specification, and in which like characters of reference indicate similar parts in the several views, Figure 1 is a side elevation of my planter. Fig. 2 is a longitudinal sectional view. Fig. 3 is a top plan view. Fig. 4 is a rear end view with part of the frame cut away. Fig. 5 is a detail side view of the hopper, in a modified form of the device.

An important object of the invention is to provide a novel means for discharging material from the hopper.

Referring to the drawings in detail, 1 is the main supporting frame having the handles A extended rearwardly therefrom at one end and formed integral therewith and supported at the opposite end by a disk 2, said disk having a plurality of concentrically arranged pins 3 extending laterally therefrom and adapted to come into successive engagement with an arm 4, formed of a strip secured to one side of the hopper 5 said strip having its forward portion bent inwardly in front of the hopper, and bent forwardly for engagement with the pins carried by the disk. The strip projects rearwardly of the frame adjacent one of the handles A forming a controlling lever 17 convenient for depression by the thumb of the operator, as will be described and the ends of said lever and forwardly extended portion are twisted to form operating portions for engagement with the pins on the disk 2 and the thumb of the operator for raising the lever out of engagement with the pins. The hopper 5 is pivoted to the frame 1 by means of a rod 7, which passes through the hopper a little to the rear of its center so that the hopper will be in a normally tilted position forward and near the upper edge of the same and having its ends seated in sockets 8 secured to the upper faces of each side of the frame 1, which hold the rod against lateral and longitudinal movement.

The hopper 5 is shown rectangular in form and for the purpose of illustration tapers toward its bottom, a longitudinal opening 9 being left therein, under which there is a semi-circular piece of sheet metal 10, secured to the opposite sides and front end of the hopper and which extends beyond the rear end of the hopper and serves as a trough or guide for the material to be conveyed from the hopper to a spout 11, which comprises a U-shaped piece of sheet material pivoted to the trough 10, by means of a bolt 12, passing through the opposite sides of each. As is more especially shown in Fig. 4 of the drawings, the trough 10 is rounded at its bottom, whereas the spout 11 is extended at a sharper angle, so that the discharge end thereof will sink slightly into the earth upon the discharge of material, when the hopper is vibrated, as previously described.

The spout 11 projects rearwardly beneath and engages against the bottom of the trough and is disposed below a discharge opening 13, in the rear side of the hopper, the size of which may be regulated by a slide 14 which is slidable in a suitable slidway, disposed in the rear face of the hopper, said slide having a semi-circular end adapted to snugly fit into the concave upper surface of the trough 10, said slide having a supporting lug 15' projecting rearwardly from the rear side thereof, adjacent its upper end. A thumb screw 15 is provided said screw being revolubly carried by a projecting arm on the upper edge of the rear face of the hopper, but being longitudinally movable therein so that said slide may be moved vertically within the guideway on the rear face of the hopper and said screw is engaged in the lug 15' carried by the slide by which the flow of material from the hopper is regulated and the amount of material sent from the hopper is proportioned as desired.

The operation of the device is as follows: The hopper is filled with the material to be distributed and pushed forward like a wheelbarrow; the disk 2 is then revolved forward and the pins 3 will raise the arm 4 until the revolution of the disk has carried the pin beyond the end of the arm, when the arm will fall into engagement with the next pin and repeat its action successively as long as the disk is revolving; by this means the hopper is vibrated causing the contents to be shaken downward into the trough 10 and through the opening 13. By reason of the pivotal connection of the spout to the trough, at each vibration of the hopper, the lower portion of the spout is meant to give a severe kick rearwardly, whereby the material falling from the trough is struck and broken up, as well as scattered. When it is desired to move the device without vibrating the hopper, as when going to or from the field where it is to be used or when maneuvering between rows of plants or furrows to be treated, pressure of the operator's thumb upon the rear end of the rod 4, lifts its forward end out of engagement with the pins of the wheel.

In the modification shown in Fig. 5, the member 4 is replaced by two members 4' and 4", one on each side of the hopper, one extending rearwardly and the other forwardly, and each extending over the shaft 7 and forming a wear plate therefor. The one 4', extending forwardly performs the same function as the forward end of the member 4, as will be readily understood, and the one 4" projecting rearwardly serves to perform the same function as the operating handle 17. These members should be disposed a spaced distance from the top of the hopper so that their lower edges would rest on the shaft 7, serving as wear plates and preventing damage to the side of the hopper by the shaft.

Having thus described my said invention, what is claimed is:

1. A grain or fertilizer distributer comprising a supporting frame, a disk carried by the forward end of said frame, a series of pins mounted concentrically on said disk and extending outwardly therefrom, a hopper pivotally mounted on the frame, the sides of said frame being extended rearwardly to form operating handles, an arm secured to the hopper and extending inwardly in front of the hopper and then forwardly for engagement with the pins and adapted to be lifted thereby during rotation of said disk, an arm extended rearwardly from the hopper and positioned for moving said forwardly extended arm when the hopper is tilted, said hopper being also provided with an opening in its rear face, a semicircular trough for the open bottom end of the hopper, said trough being open at its rear end, a spout pivotally secured to the rear end of said bottom trough, said spout being converged at a sharper angle than the bottom trough, a slide carried by the rear end of the hopper, said slide being movable in the slot and means for regulating the position of the slide within the slot.

2. In a grain or fertilizer distributer, the combination with a supporting frame comprising a pair of arms, said arms being converged forwardly, the rear ends of said arms being adapted as operating handles, of a disk journaled at the forward ends of said arms, a plurality of pins concentrically mounted on said disk and extending outwardly from one side thereof, a transverse rod mounted intermediate the ends of said frame, and upon the upper faces thereof, a hopper pivotally carried by the rod and within the frame, said hopper being provided with an open bottom portion and having an opening formed in its rear end terminating short of its top, a semi-circular metallic trough secured to the sides and forward end of said hopper, said trough extending rearwardly therefrom and having its rear end open, a spout pivotally carried by a transverse rod on the rear end of the trough, said spout surrounding the trough and being converged to a sharper angle than the trough, a slideway having a circular lower end, said slideway being movable in the slot in the rear end of the hopper, a projecting lug formed on said slideway, said lug being adapted for engagement with a screw threaded member, an operating screw carried by the hopper at its upper edge and disposed in engagement with said lug to move the slideway vertically, said slide having its under end adapted for snug engagement with the trough to securely close the same, an arm secured to the hopper on one side thereof, said arm being extended inwardly in front of the hopper, then forwardly to engage the pins, the forward end thereof being twisted for such engagement, said arm being positioned above the pivot rod which is positioned to one side of the longitudinal center of the hopper, said hopper being adapted to be vibrated upon rotation of the disk and a controlling lever extending rearwardly from the hopper whereby said hopper may be tilted and said forwardly extending arm moved out of engagement with the pins on the disk.

In testimony whereof I affix my signature, in presence of two witnesses.

JAMES $\overset{\text{his}}{\times}$ JOSEPH BRADY.
$\phantom{JAMES\ }_{\text{mark}}$ Witnesses:
E. F. LIVINGSTON,
J. J. LEONARD.